Jan. 27, 1970   J. D. KARRAS ETAL   3,491,477
FISHING TACKLE ATTACHMENT DEVICE
Filed Feb. 16, 1967   2 Sheets-Sheet 1

INVENTOR.
JOSEPH D. KARRAS
BY RICHARD CAPOLUPO
Browne, Schuyler & Beveridge
ATTORNEYS

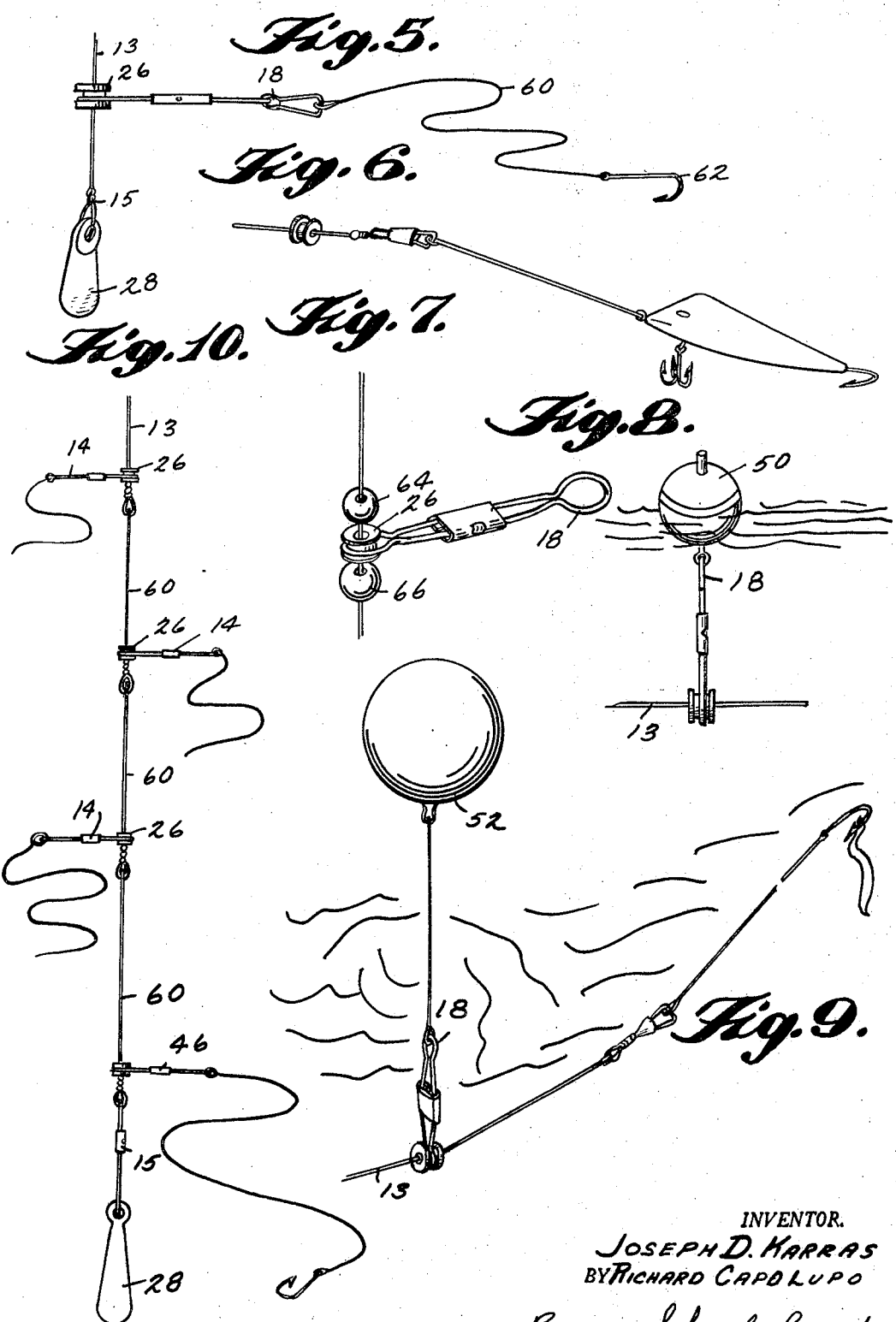

United States Patent Office 3,491,477
Patented Jan. 27, 1970

---

3,491,477
FISHING TACKLE ATTACHMENT DEVICE
Joseph D. Karras, 110 Longwood Ave., Brookline, Mass. 02146, and Richard Capolupo, Plum Island Blvd., Newbury, Mass. 01950
Filed Feb. 16, 1967, Ser. No. 616,571
Int. Cl. A01k 91/04
U.S. Cl. 43—44.84                                    4 Claims

ABSTRACT OF THE DISCLOSURE

A link having opposite end loops interconnected by a shank portion which is separable in order to open either loop. One loop receives a line bearing member which has a central passage for receiving the terminal portion of a fishing line or leader so that the link and fishing line are movable relative to each other. The other loop is employed to secure terminal fishing tackle such as a sinker, float or hook.

---

This invention generally relates to terminal fishing tackle and devices for securing same to the end of a fishing line or leader. More specifically the present invention involves a new and improved device for releasably attaching terminal fishing tackle such as lures, bait, sinkers and the like to the end of a fishing line or leader.

One of the objects of the present invention is to facilitate the attachment or removal of terminal fishing tackle with respect to a fishing line in a manner suitable for all types of fishing or fishing techniques including fresh or salt water fishing, casting, trolling, etc.

A further object of the present invention is to provide a novel attachment device by which terminal fishing tackle may be easily attached or removed with respect to a fishing line while being extremely versatile for use in various fishing techniques and in facilitating conversion from one fishing method to another.

A further object of the present invention is to provide such an attachment device which helps to properly position terminal fishing tackle for a specific fishing operation and moreover minimizes entanglement of certain terminal tackle elements.

A further object of this invention is to provide a device which may be employed in the manufacture of various fishing rigs, and when so employed, its intrinsic design will permit it to be temporarily disassembled allowing it to be stored without danger of entanglement with other objects in the storage area.

A still further object is to provide a fishing tackle attachment device which will achieve the above objects and yet is compact, durable, easy and safe to employ and which moreover may be economically manufactured for sale at relatively low retail price.

Other objects and advantages of the present invention will become apparent from the following more detailed description taken in conjunction with the accompanying drawings, in which:

FIGURES 5 through 9 are views illustrating various different uses of the attachment device at the end of a fishing line.

Figure 1:
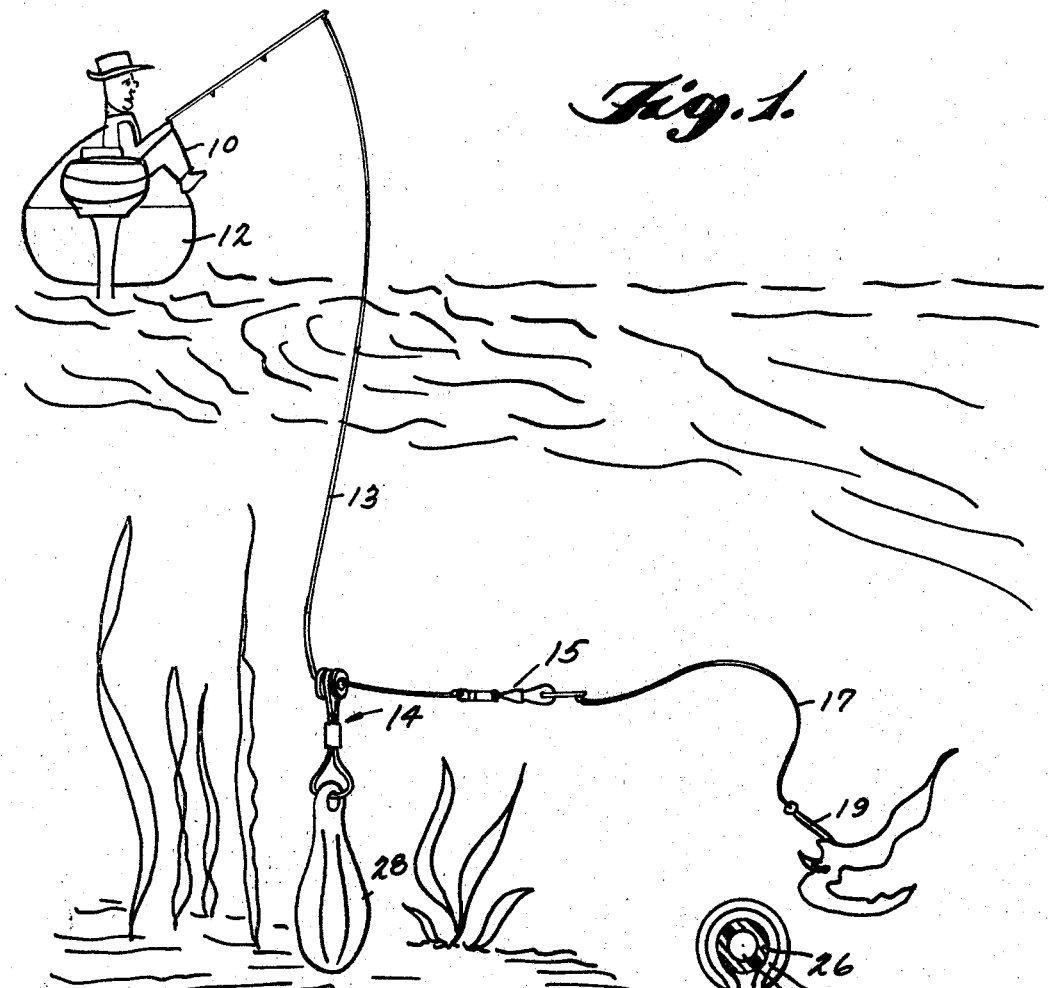
FIGURE 1 is a pictorial representation of a fisherman employing the novel attachment device of the present invention.

Referring to the drawings in detail, FIGURE 1 illustrates what may be termed a "bottom fishing" operation wherein a fisherman generally designated 10 is fishing from a boat 12 and employing an attachment device generally designated 14 constructed in accordance with the present invention.

Figure 2:
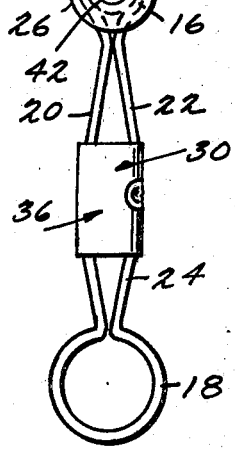
FIGURE 2 is an enlarged elevational view of the attachment device shown in a closed position.
Figure 3:
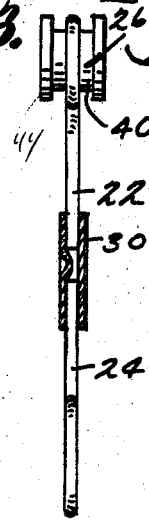
FIGURE 3 is a side view of the attachment device of FIGURE 2.
Figure 4:
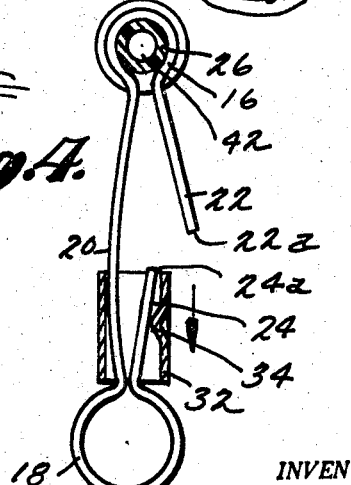
FIGURE 4 is a view generally similar to FIGURE 2, but with the attachment device shown in an open position.

In the illustrated embodiment the attachment device 14 includes a link or connecting member made from metallic wire, preferably steel wire, having integrally formed at its opposite ends a small loop 16 and a large loop 18 which are interconnected by a first continuous shank portion 20 and second and third shank portions 22, 24 situated generally alongside the first shank portion 20. Shank portions 22, 24 are separated from each other and in their unstressed condition extend outwardly generally away from continuous shank portion 20 so as to, in effect, open loops 16, 18; FIGURE 4 illustrating the open position of loop 16. This open position of loop 16 is employed for attaching or removing the link with respect to a line bearing member 26 which will be subsequently described. The open position of large loop 18 is employed for attaching or removing with respect to the link, terminal tackle elements such as the shown sinker 28 or the elements to be described. To close loops 16, 18 the severed shank portions 22, 24 are deformed inwardly such as by manual pressure and a locking sleeve 30 is fitted over them as well as continuous shank portion 20. Locking sleeve 30 is slidably along the shank portions between a first central position shown in FIGURE 2 wherein it locks the shanks in their retracted position for maintaining the loops closed and a second end position adjacent loop 18 as shown in FIGURE 4 for opening small loop 16 while maintaining large loop 18 closed. In the central locking position shown in FIGURE 2, locking sleeve 30 extends over both shank portions 22, 24 to prevent their outward movement by engagement of shank portions 22, 24 with the end wall 32 of the locking sleeve.

Movement of locking sleeve 30 along the shank portions is prevented by a projection 34 located internally of the locking sleeve to be engageable with the extremities 22a, 24a of shank portions 22, 24. This prevents accidental or unintentional axial movement of locking sleeve 30 along the shank portions. However, when it is desired to move the locking sleeve in either direction along the shank portions to open either loop, shank portions 22, 24 are manually depressed to clear projection 34 whereupon the sleeve may be slid along the link into the desired position. In the shown embodiment sleeve 30 is formed with flat opposite side walls 36 and narrow end walls 32 which are arcuate to accommodate the curvature of the shank portions. Additionally, the internal projection 34 is formed by punching inwardly a portion of the locking sleeve generally at one of its end walls 32.

Line bearing member 26 which is received in the small loop 16 is formed from a corrosion-proof, low friction and high strength material such as nylon, plastic, polytrafluorethylene and has a spool-shaped body including a hollow shaft 40 having a central passage 42 for freely receiving a fishing line designated 13 or a leader. At the opposite ends of the shaft 40 are annular flanges 44 integrally formed with the shaft. The outside diameter of the shaft is such as to be freely received in the small loop 16 so that the line bearing member 26 may freely rotate relative to the connecting link. Flanges 44 have a greater diameter than loop 16 to retain and limit axial movement of shaft 40 relative to the small loop 16. Additionally, the opposite end edges of the line bearing member 26 which contact the fishing line are bevelled (not shown) to avoid chafing and wear of the fishing line when in use. Moreover, the line bearing spool 26 is lightweight and of small overall dimensions. For example, in one embodiment the line bearing spool is about ¼" (inches) in diameter across the flanges 44, about ¼" (inches) in overall axial length, that is, along the axis of passage 42, and about ⅛" (inch) in length between the flanges 44.

Line bearing member 26 may be permanently retained on the fishing line for removably attaching the connecting link with respect to the latter. In the illustration of FIGURE 1 the line bearing member 26 receives the terminal portion of fishing line 13 and sinker 28 is attached to the large loop 18. The extremity of the fishing line is attached a swivel 15 which connects to a leader 17 carrying a hook 19 and bait in typical fashion. It will be seen that in this particular use, the hook and bait are free to move relative to the sinker.

In initially assembling the tackle shown in FIGURE 1, bearing member 26 alone is on the fishing line 13 and the swivel 15 with its associated leader 17 and hook 19 is connected to the extremity of the fishing line. The connecting link with sinker 28 attached is then attached to bearing member 26 by opening loop 16 and placing it about shaft 40. Finally, locking sleeve 30 is moved into the locking position shown in FIGURE 2 readying the tackle for a fishing operation.

Should it be desired to remove sinker 28 for effecting a different fishing operation for example, locking sleeve 30 may be moved to the end position adjacent loop 16 thus opening large loop 18 whereby the sinker may be removed and replaced with a floating bob 50 or balloon 52 as shown in FIGURES 8 and 9, respectively.

FIGURE 5 illustrates another use of the attachment device of the present invention wherein the extremity of the fishing line 13 has the swivel 15 to which is connected sinker 28 while the large loop 18 of the connecting link is used to attach a leader 60 and hook 62. In this arrangement, line bearing member 26 is free to move around fishing line 13 and moreover leader 60 and hook 62 are held at an angle to the line which is desirable particularly from the standpoint of minimizing entanglement.

FIGURE 6 illustrates a conversion of the terminal tackle for purposes of surf casting, for example, where a sinker is not employed. In such case, the connecting link in removed from the line bearing member 26 which permanently remains on the end of the fishing line.

FIGURE 7 illustrates use of the attachment device in conjunction with lead beads 64, 66 positioned on the fishing line on opposite sides of the line bearing member.

FIGURE 10 shows a rig for use in fishing for mackerel, cod and the like wherein the sinker 28 is attached to the terminal end of the fishing line 13 by means of a swivel 15 and a plurality of leaders 60. Attachment devices 14 are placed along leaders 60 by means of the line bearing member 26. In this manner the line bearing members 26 are free to move along as well as about the leader. Moreover, large loops 18 of the attached devices have connected thereto leaders and hooks.

We claim:
1. A fishing tackle attachment device comprising in combination, a wire-like element having formed at one end a loop for receiving an element of terminal fishing tackle, said wire-like element having a second loop at its other end, and a line bearing member freely rotatably received in said second loop and having a axial unobstructed central passage dimensioned to loosely receive a fishing line or leader, said line bearing member having axially spaced annular flanges engageable with said second loop for retaining the line bearing member in said second loop, the portions of the line bearing member forming said central passage being annularly continuous throughout the axial extent of said central passage to retain the line bearing member on the fishing line or leader, and means intermediate said wire-like element for opening either loop while closing the other loop so that a tackle element may be applied or removed from said one loop while retaining the second loop in said bearing member.

2. In combination with a fishing line or the like, a tackle assembly comprising in combination, an annular bearing member having a continuous axial through passage extending between opposite ends thereof and freely receiving the terminal end of the fishing line, said axial through passage in said bearing member having a diameter greater than the line and the line being unobstructed so that the fishing line and bearing member are free to move an unlimited amount relative to each other along the direction of the line throughout the terminal portion of the line, portions of the bearing member defining said through passage being annularly continuous so as to retain the bearing member on the line against removal laterally from the line, attachment means on the bearing member for attaching a terminal tackle element with respect to the bearing member, said attachment means including a loop received about the bearing member and having a diameter greater than the outside diameter of the bearing member so that the loop is free to rotate relative to and about the bearing member without obstruction, said bearing member having opposite end flanges preventing movement of said loop axially off the bearing member, said attachment means including a second loop for receiving a tackle element, and means for opening and closing said second loop to permit insertion or removal of a tackle element with respect to said second loop, said bearing member having its axial passage entirely free except for receipt of the line to insure free unlimited movement of the bearing member along the line.

3. The combination defined in claim 2 wherein said means for opening and closing said second loop is also employed for opening said first loop to remove said attachment means from said bearing member.

4. The combination defined in claim 2 wherein said bearing member is formed from a low friction corrosive proof plastic-like material, and has an axial length of about one-quarter of an inch, said flanges having an outside diameter of about one-quarter of an inch, and the length of the bearing member between said flanges being about one-eighth of an inch.

References Cited
UNITED STATES PATENTS

| | | | |
|---|---|---|---|
| 279,206 | 6/1883 | Van Altena | 43—43.15 X |
| 1,114,289 | 10/1914 | Rittenhouse. | |
| 2,306,112 | 12/1942 | Touchstone | 43—24 |
| 2,315,307 | 3/1943 | Wilson | 43—44.83 |
| 2,561,675 | 7/1951 | Ross | 43—24 |
| 1,670,185 | 5/1928 | Bond | 43—44.84 |

FOREIGN PATENTS 1,370,710  7/1964  France.

SAMUEL KOREN, Primary Examiner

D. J. LEACH, Assistant Examiner

U.S. Cl. X.R.

24—238; 43—24